(No Model.)
F. W. GORDON.
DEVICE FOR TRANSMITTING ROTARY MOTION.
No. 467,593. Patented Jan. 26, 1892.
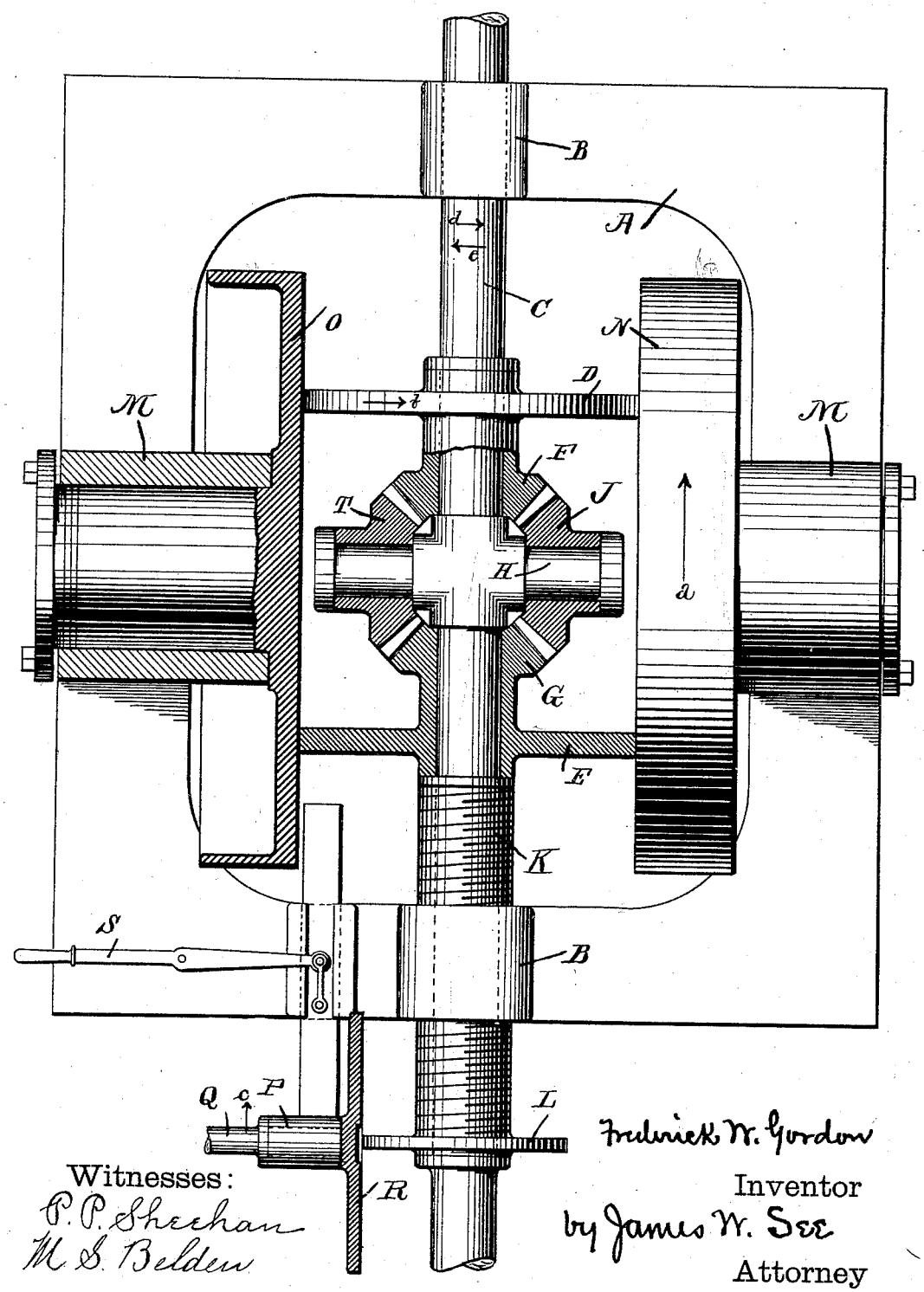
Witnesses:
P. P. Sheehan
M. S. Belden
Frederick W. Gordon
Inventor
by James W. See
Attorney

UNITED STATES PATENT OFFICE.

FREDERICK W. GORDON, OF PHILADELPHIA, PENNSYLVANIA, ASSIGNOR TO THE PHILADELPHIA ENGINEERING WORKS, LIMITED, OF SAME PLACE.

DEVICE FOR TRANSMITTING ROTARY MOTION.

SPECIFICATION forming part of Letters Patent No. 467,593, dated January 26, 1892.

Application filed August 26, 1891. Serial No. 403,778. (No model.)

*To all whom it may concern:*

Be it known that I, FREDERICK W. GORDON, of Philadelphia, Philadelphia county, Pennsylvania, have invented certain new and useful Improvements in Devices for Transmitting Rotary Motion, (Case B,) of which the following is a specification.

My invention will be readily understood from the following description, taken in connection with the accompanying drawings, which is a plan, with parts in horizontal section, of a transmitting device embodying an exemplification of my invention.

In the drawings, A indicates a frame; B, a pair of journal-boxes supported thereby with their axes in a common line; C, a shaft mounted therein; D, a disk loose on the shaft; E, a similar disk loose on the shaft, these two disks being hereinafter referred to as the "brush-wheels;" F, a bevel-gear loose on the shaft and fast to brush-wheel D; G, a bevel-gear loose on the shaft and fast to brush-wheel E; H, a stud projecting at right angles from the shaft between the two bevel-gears and forming a planetary stud; J, a bevel-gear loose on this stud and gearing with the bevel-gears F and G, this gear forming a planetary gear; K, a threaded sleeve loose on the shaft and engaging between collars thereon and screwing through one of the journal-boxes B; L, a brush-wheel fast on this sleeve; M, journal-boxes supported by the frame with their axes at right angles to the shaft C; N, a friction-disk mounted loosely in one of these journal-boxes and having a flat face engaging the peripheries of the brush-wheels D and E, the rim of this disk serving, also, as a pulley-rim by which motion may be taken by belt to or from the friction-disk; O, a similar friction-disk opposite the disk N; P, a journal-box at right angles to the shaft C at the brush-wheel L and adapted for sliding motion in the direction of the length of the shaft; Q, a shaft mounted in this sliding journal-box; R, a friction-disk fast on this shaft and having a flat face adapted to engage the periphery of the brush-wheel L, the face of this friction-disk being recessed at its center, so that when this recessed portion is at the brush-wheel L the brush-wheel will not be engaged by the disk; S, a hand-lever for shifting the sliding journal-box, and T a secondary planetary gear carried by the shaft opposite the planetary gear J and introduced merely for the purpose of counterbalancing the weight and strains of the gear J, which gear J will be the one referred to when the planetary gear is spoken of.

Disk O is introduced merely to balance the side pressure on the shaft due to the force employed in producing frictional contact betact between disk N and the brush-wheels D and E. The presence of disk O and of gear T may be ignored.

Assume that disk N is driven, as by belt, at high speed in the direction of arrow *a* at a regular rate of speed. Assume that the brush-wheels D and E are equidistant from the center of the disk, as they appear in the drawing. The disk will drive brush-wheel D in the direction of arrow *b* and will drive brush-wheel E in the opposite direction, both brush-wheels revolving at the same speed. Gear F turns with brush-wheel D and rotates the planetary gear J upon its stationary stud H. Gear G forms no impediment to the rotation of the planetary gear, because gear G is turning in the direction and at the rate of speed as it would if actually driven by the rotation of the planetary gear instead of through the brush-wheel E. The result is that the shaft stands still and the planetary gear turns idly on its stud. If now we move the shaft endwise a trifle toward the upper portion of the drawings, we still have the two brush-wheels D and E turning in opposite directions, as before; but the two brush-wheels no longer engage the disk equidistantly from its center, and therefore the two brush-wheels will not turn at their former rates of speed, nor will they both turn at the same rate of speed. Brush-wheel D will turn faster than it did before and brush-wheel E will turn slower than it did before. Gear F still seeks to turn the planetary gear idly on its stud; but gear G is not turning fast enough to allow the planetary gear to rotate freely, as in the former case. If the shaft could not turn a dead-lock would occur at the planetary gear; but the shaft is free to turn, and it will turn in the direction in which brush-wheel D turns (arrow *b*) and permit the planet-stud and planet-gear to take up a motion of planetary advance around the shaft. The rate of this planetary advance will be governed by the difference in velocities between gears F and G. In other words, if the two brush-wheels D and E do not turn at the same velocity the planet-gear is forced into planetary motion, and consequently the shaft C is rotated in the direction of rotation of the fast-moving brush-wheel.

The two brush-wheels may be so adjusted that their rates of rotation differ to an infinitely small degree, and the result will be that the shaft is turned at an infinitely slow rate of speed. The rate of speed of the shaft may be altered by adjusting the position of the brush-wheels with reference to the disk which drives them, and the direction of motion of the shaft is also under control, the shaft moving in the direction of rotation of the faster-turning brush-wheel. The device therefore provides for an infinitely great reduction of speed for a control of the direction of transmission, for the most delicate graduations of reduction, and for powerful transmissions. Within certain limits the device may also be used for multiplication of speeds, slow-speed motion given to the shaft being converted into high-speed motion at the disk.

As the device is capable of transmitting great power, it may, in cases, be found inconvenient to effect the adjustment of the brush-wheels across the disk by hand through the medium of direct-acting hand connections. I therefore provide for effecting the adjustment by power under the control of a pilot device operated by hand.

Assume disk R to be driven from any suitable source of rotary motion continuously in the direction of arrow c. Brush-wheel L is at the recess of the disk and free from contact with or controlled by it. If now we shift the disk R toward the upper part of the drawings a definite distance, the disk will engage the brush-wheel and rotate it in the direction of the arrow d shown on the shaft. The consequence is that the sleeve screws farther into its bearing and moves the brush-wheels D and E to a new position. The brush-wheel L and the adjusting motion will cease as soon as the brush-wheel L shall have moved inwardly across disk R far enough to reach the central recess and clear its face. Consequently the brush-wheels D and E will have been adjusted by power to a new position corresponding with the degree of adjustment given by hand to the sliding bearing. The same effect follows for either direction of adjustment of the sliding bearing.

The planetary system of gearing which I have shown in exemplifying my invention is of a well-known type, and my invention may be equally well realized by the employment of types of planetary gearing well known as the equivalents for that shown in the exemplification. So, also, the invention may be realized by substituting well-known equivalent means in place of the pulley-rim for transmitting rotary motion to or from the disk.

As a mere example of the utility of the system, mention may be made of a hoisting device. Let power be applied to rotate N and let C do or cause the winding of the hoisting-rope. The power and speed of winding and unwinding may be controlled by shifting the brush-wheels.

I claim as my invention—

1. In a device for transmitting rotary motion, the combination, substantially as set forth, of a shaft, two brush-wheels, a planetary system of gearing connecting the brush-wheels with the shaft, and a flat-faced rotary disk with its face in frictional contact with the two brush-wheels.

2. In a device for transmitting rotary motion, the combination, substantially as set forth, of a shaft, two brush-wheels, a planetary system of gearing connecting the brush-wheels with the shaft, a rotary disk with its face in engagement with the two brush-wheels, and means for adjusting the relative positions of the brush-wheels and disk.

3. In a device for transmitting rotary motion, the combination, substantially as set forth, of a shaft, a brush-wheel connected therewith, a rotary disk engaging the brush-wheel, a second brush-wheel for adjusting the position of the first brush-wheel relative to said disk, mechanism for causing the first brush-wheel to move across said disk according as the second brush-wheel is turned, a second rotary disk, and means for bringing said second disk into engagement with said second brush-wheel.

4. In a device for transmitting rotary motion, the combination, substantially as set forth, of a shaft, a brush-wheel connected therewith, a rotary disk engaging the brush-wheel, a second brush-wheel for adjusting the position of the first brush-wheel relative to said disk, mechanism for causing the first brush-wheel to move across said disk according as said second brush-wheel is turned, a second rotary disk, and means for shifting said second rotary disk with reference to said second brush-wheel.

5. In a device for transmitting rotary motion, the combination, substantially as set forth, with a rotary disk and a brush-wheel engaging it and arranged to shift across it, of a rotary pilot-disk, a hand-piece for adjusting the position of the pilot-disk, and mechanism for causing the rotary motion of the pilot-disk to effect the shifting of the brush-wheel with reference to its rotary disk.

FREDERICK W. GORDON.

Witnesses:
RICHARD G. LODGE,
JAMES McLAUGHLEN.